(12) United States Patent
Nettleton et al.

(10) Patent No.: US 6,556,614 B2
(45) Date of Patent: Apr. 29, 2003

(54) MONOLITHIC SOLID STATE LASER ASSEMBLY AND METHOD OF MANUFACTURE

(76) Inventors: John E. Nettleton, 8106 Oak Hollow Ct., Fairfax Station, VA (US) 22039; Bradley W. Schilling, 70 King Henry Ct., Fredericksburg, VA (US) 22406; Dallas N. Barr, 11974 William and Mary Cir., Woodbridge, VA (US) 22192

( * ) Notice: Subject to any disclaimer, the term of this patent is extended or adjusted under 35 U.S.C. 154(b) by 0 days.

(21) Appl. No.: 10/107,241

(22) Filed: Mar. 28, 2002

(65) Prior Publication Data

US 2002/0097756 A1 Jul. 25, 2002

Related U.S. Application Data

(63) Continuation-in-part of application No. 09/496,281, filed on Feb. 1, 2000, now Pat. No. 6,373,865.

(51) Int. Cl.[7] .............................. H01S 3/10; H01S 5/00; H01S 3/20; H01S 3/08; H01S 3/00
(52) U.S. Cl. ................... 372/107; 372/54; 372/109; 372/108; 372/21; 372/50
(58) Field of Search ................. 372/107, 109, 372/108, 21, 27, 50, 55, 101, 54

(56) References Cited

U.S. PATENT DOCUMENTS 4,731,795 A * 3/1988 Clark et al. ................. 372/107
5,854,802 A * 12/1998 Jin et al. ...................... 372/22

* cited by examiner

Primary Examiner—Paul Ip
Assistant Examiner—Armando Rodriguez
(74) Attorney, Agent, or Firm—Milton W. Lee; John E. Holford

(57) ABSTRACT

A laser cavity assembly for high power optical range-finders consisting of two rods of lasing material co-axially mounted on a thin substrate of the same or thermally equivalent material, selected end-faces of the rods being bonded to layers or wafers of optical materials chosen from a group consisting of materials used in Q-switches, filters, matching transformers, linear polarizers and reflecting mirrors.

12 Claims, 3 Drawing Sheets

US 6,556,614 B2

MONOLITHIC SOLID STATE LASER ASSEMBLY AND METHOD OF MANUFACTURE

RELATED APPLICATION

This application is a Continuation in Part of patent application Ser. No. 09/496,281 filed Feb. 1, 2000 now U.S. Pat. No. 6,373,865, now pending in Art Unit 2877.

BACKGROUND OF THE INVENTION

1. Field of the Invention

The present invention generally relates to optically pumped, solid-state, q-switched and linearly polarized laser cavity assemblies and, more specifically, to a method of making these non-pump elements in one piece that can produce pulse energies of 1–1000 millijoules for rangefinders.

2. Description of Prior Art

Many military and commercial applications require high power optical pulses and normally employ lasers consisting of cavity assemblies surrounded by energetic Xenon, pyrotechnic or similar types of flash lamps or a diode lasers that provide the necessary pump power. Each cavity assembly; which includes all laser elements except the optical pump; is typically made up of at least four discrete elements. The first element is a rod, many times longer than its diameter of nonconductive crystalline gain material that lases at a characteristic wavelength when exposed to the light pump. The rod normally has a uniform regular cross-section and a longitudinal optical axis centered in that cross-section. The ends of the rod are ground and polished normal to this axis. The second element is usually a perfectly flat highly reflective (HR) mirror, at least for the lasing wavelength, mounted precisely normal to the rod axis and spaced slightly from a first end of the rod. The third element is an output coupler or (OC) mirror which, though also highly reflective, has a specified percent transmission (leakage), at the lasing or output wavelength. The third element is mounted similar to the second near the opposite or output end of the rod. The fourth element, an optional passive q-switch, is a wafer of material with flat and parallel broad faces centered on the optical axis of the rod between the second and third elements and parallel to them. The passive q-switch reduces the Q of the high Q cavity defined by the other three elements, until the inverted population of energy quanta in the rod reaches a critical level. The wafer then automatically restores the high Q to generate a short high power pulse. The rod of gain material is usually a well known laser crystal, such as Neodymium:Yttrium-Aluminum-Garnet (Nd:YAG), ruby, etc. These laser crystals absorb the pump wavelength and fluoresce at the lasing wavelengths. The assembly will lase without the q-switch, but does not emit sufficient peak power for range finders and similar applications. The q-switch concentrates the output photons in time spaced pulses that have peak powers several orders of magnitude greater than output that is not Q-switched. The passive q-switch can be a wafer of impregnated plastic or other materials. Additional elements may include anti-reflection coatings, a polarization device and an optical parametric oscillator to change the output frequency. In prior art embodiments the purpose of using adjustable spaced elements has been to compensate for their imperfect shape and/or placement. The disadvantage of these assemblies lies in the large number of elements required and the need for numerous adjustable support members that permit precise mechanical alignment of the various optical components. These support members make manufacturing and repair of the assemblies very complicated and expensive.

A goal of the present invention is to reduce the number of parts in the cavity assembly to two active optical elements and finally to a single structure by adding a novel base pallet. An assembly using an optical parametric oscillator is not part of this disclosure, but is covered in applicants' co-pending application mentioned above. A simpler structure using only one laser rod is described in applicants' copending application (NVL-3213) entitled "PSEUDO-MONOLITHIC Q-SWITCHED LASER WITH A BREWSTER NOTCH POLARIZER".

SUMMARY OF THE INVENTION

A photon pumped laser cavity assembly consisting of a pair of coaxial rods made from laser gain material with precisely cut side-faces and end-faces. Some of the end-faces are covered by at least one of a dielectric or metal coating highly reflective to the laser output beam, a wafer of polarizing material, and a dielectric or metal coating partially reflective to the laser beam. In one configuration the rods may each have one of a pair of uncovered parallel closely opposed polarizing end-faces oriented at the Brewster angle to the common optical axis of the rods. In all configurations the rods are mounted on a pallet or substrate that maintains their orientation and position.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is related to a laser assembly disclosed in applicant's copending Application No. Ser. 09/496,281 for a Pseudo-Monolithic, Passive Q-switched, 1.5 micron Solid-State Laser with an Intracavity Optical Parametric Oscillator. That one-piece assembly consists of at least six parts including two rods of laser gain material with at least two coated, plated or bonded layers on their end-faces; an optical parametric oscillator rod; and a pallet to which the rods are attached. In the present application the assembly is less sophisticated and consists of at least five parts including two rods of laser gain material, two end-faces of which are plated a mirror, and a mounting pallet. The two rods may also include additional wafer-shaped parts chosen from anti-reflection coatings, filters, polarizers, and Q-switches.

Figure 1:
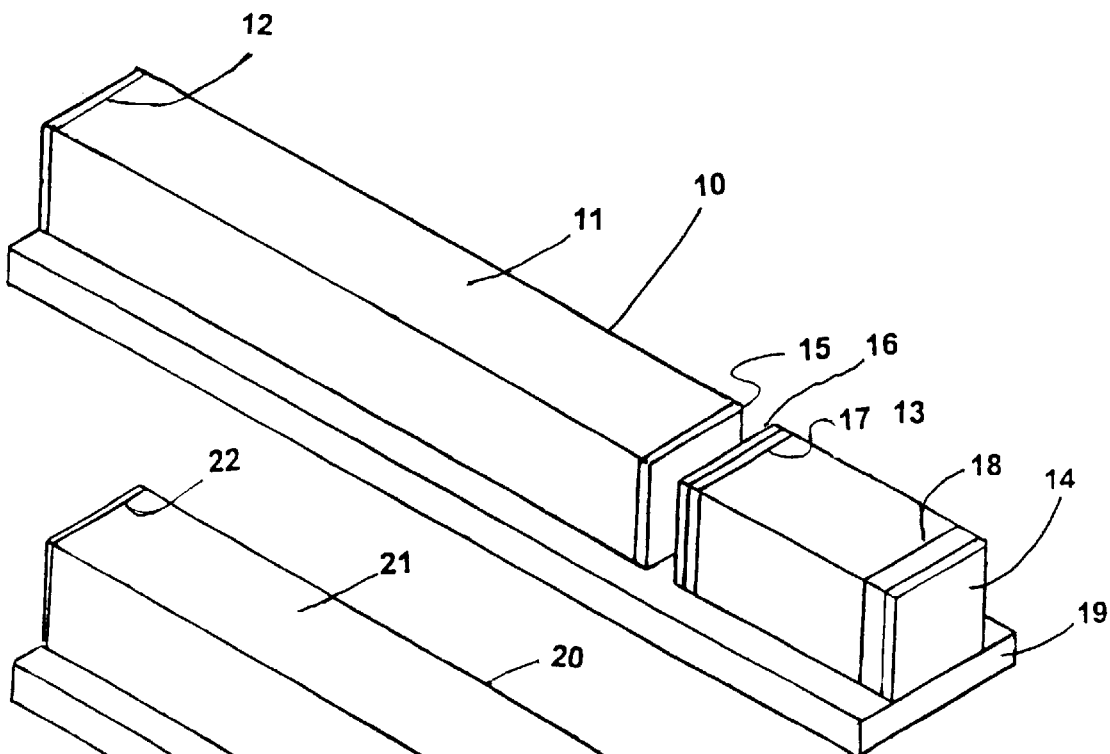
FIG. 1 shows a laser cavity assembly with a rod having a square cross-section, an input mirror, an output mirror, a Q-switch, and a flat normal polarizer, assembled on a thin rectangular pallet.

As shown in FIG. 1 applicant's monolithic solid-state laser assembly 10 functions like a standard light pumped laser, but consists of only one component after fabrication. State of the art manufacturing and fabrication techniques are used to combine the optical elements into a single element with the same functionality. The assembly uses a long rod of laser gain material 11, a first end of which defines the surface of a HR (Highly Reflecting) mirror 12 plated thereon. The assembly also uses a short rod of laser gain material 13, an ultimate end of which defines the surface of an OC (Output Coupling) mirror 14 plated thereon. A second end of the long rod and a penultimate end of the short rod may be coated with anti-reflection coatings 15 and 16, respectively, to prevent beam reflections at these faces. These may be a quarter-wavelength thick layer of magnesium fluoride. The laser gain material may be ruby, emerald, sapphire, or any of the known laser media. However, Neodymium:Yttrium-Aluminum-Garnet, which lases at an output wavelength of 1.06 μm, is preferred. The long rod, which may have any cross-sectional shape, but preferably has a regular polygonal or most preferably square cross-section, is several centimeters long and several millimeters wide. The short rod, which has the same cross-section as the long rod, may be only a few times longer than its width. Opposite side-faces of the rods are cut and polished very precisely to be flat within a small fraction of the 1.06 μm wavelength and parallel within a tolerance of at most thirty seconds, but preferably no more than ten seconds of arc. The HR and OC end face of each rod are cut very precisely to be similarly flat and normal to the side faces also within the above tolerance.

In a slightly different embodiment, the OC and/or the HR end-faces of the rods are polished with a slight convex curvature, also within the above tolerance, to the surface defined by a sphere several meters in diameter centered on an extension of the optical axis. The reflection behaves essentially as it did when the mirror was flat, but this slight curvature tends to concentrate the lasing rays slightly toward the axis to produce a more intense and better-defined beam. One end of each rod is then plated with a material that is an excellent high energy reflector for the output wavelength such as silver, gold, aluminum, chromium, or other well known mirror materials, to form the HR and OC mirrors, respectively. The rods also preferably have the same regular cross-section, such as the square configuration in FIG. 1. The longitudinal optical axis will then be centered in these cross-sections.

When the adjacent end-faces are normally aligned to the axis they may be covered with anti-reflection (AR) layers 15 & 16. One or more additional thin flat optical elements can be provided with matching cross-sections and placed on the end-faces before adding the AR layers. Examples are a polarizing layer 17, such as "Polaroid" or a thin layer of some dichroic polarizing crystal and a wafer 18 of Q-switch material, such as Cr4+:YAG. The wafer must have parallel end-faces polished to the same tolerances as the end-faces of the rods.

When the rods each have a corresponding flat side, these sides are placed on a top broad flat surface of a thin pallet 19. This surface should be flat to the same tolerance as the sides of the rods. The optical axes of the rods are first aligned and then the corresponding flat sides are bonded to the pallet. The sides and/or the broad surface may be coated with an adhesive, which functions as a lubricant during axial alignment before drying; e.g. an epoxy resin. Alternatively the sides and broad surface may be coated with a material that alone or with irradiation forms a diffusion bond between them. The rods are then clamped until the bond is complete. Alignment can be accomplished manually using a flat edge face of the pallet normal to the top surface, a straight reference line or a straight edged tool placed on the pallet. In production the straight edged tool may be a pair of straight edged vise jaws, designed to precisely align and place the rods on the pallet. These alignment tools and the pallet should be held to the same tolerances specified above for the rods.

The pallet, preferably, also has a broad flat bottom face parallel to the upper face. The broad faces may match one another and the width of the rods, or they may be wider and formed with mounting aids, not shown, such as indentations, holes, grooves, or projections, if desired. The straight flat alignment edge face should be slightly longer than the combined length of the rods. The pallet must have the same thermal expansion coefficient as the rods. A convenient solution to this problem is to use slightly imperfect portions of the boule from which the rods are made, i.e. portions not suitable for laser rods. This provides matching crystal lattices that can be diffusion bonded for even greater durability and reliability.

Figure 2:
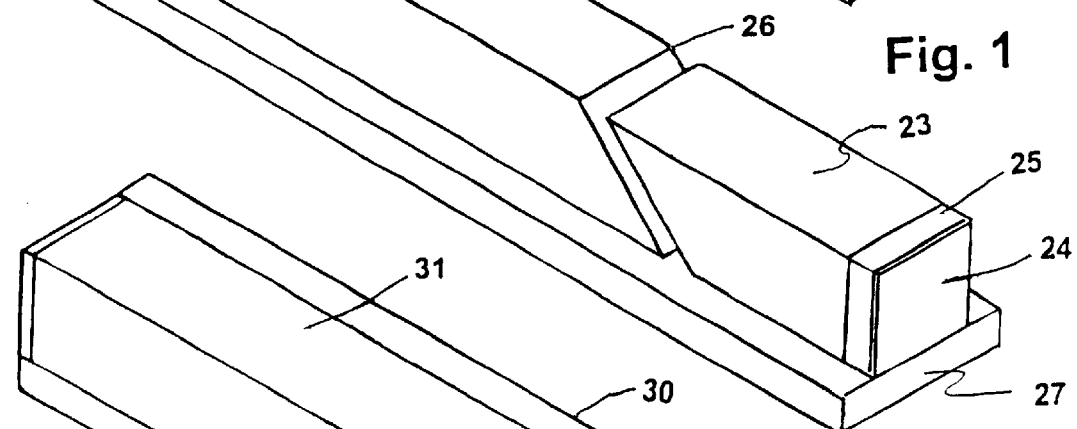
FIG. 2 shows a cavity similar to FIG. 1, but having only three components with a Brewster-Gap polarizer.

FIG. 2 shows another embodiment of an assembly 20 wherein only the HR end of the long rod 21 has a coating, an HR mirror 22. Similarly, only the OC end of the short rod 23 has a coating, the OC mirror 24 and, if desired, one or more layers and/or wafers of material 25 attached to further process the beam. The inner broad surface of these wafers or layers is formed to match the shape of the OC end. The outer broad surface may be flat or curved, as indicated above, and is coated with the OC mirror. Depending on the material from which they are made, their inclusions, thickness and surface features these elements can be used for q-switching, impedance matching, filtering, polarizing, shaping or even shifting the frequency of the beam. In particular one wafer may be Cr(4+):YAG, which provides a passive q-switch that is inherently thermally matched to an Nd:YAG rod.

Another optional feature of this assembly may be a special Brewster-Gap polarizer 26, between the ends of the rod. This consists of a slit, e.g. preferably formed by a precision thickness thin flat saw blade or abrading disk, that saws through a single rod to separate the long and short rod, before or after the rod or rods are mounted on the pallet. This provides two flat parallel opposed surfaces sloping with the optical axis at the Brewster angle ($\phi$=arctangent $\eta$), where $\eta$ is the index of refraction of the rod. Normally, about 15% of the unwanted polarization from a randomly polarized beam is removed by a single surface Brewster polarizer, but the repeated reflections in a laser cavity insure that the beam will be nearly 100% linearly polarized. The desired polarization also would normally be refracted at a substantial angle from a single surface, but the two closely spaced surfaces of the gap permit only a slight non-angular ray shift. The Q-switch must also be fabricated such that its surfaces are flat and parallel or spherical and concentric to match the tolerances of the output end of the rod, since the output face of the q-switch shapes and positions the OC mirror in this design. As in FIG. 1, the elements preferably have the same regular cross-section such as circular, triangular, square, pentagonal, hexagonal, etc. The longitudinal optical axis as before is centered in these cross-sections and aligned before bonding the rods to a pallet 27.

Figure 3:
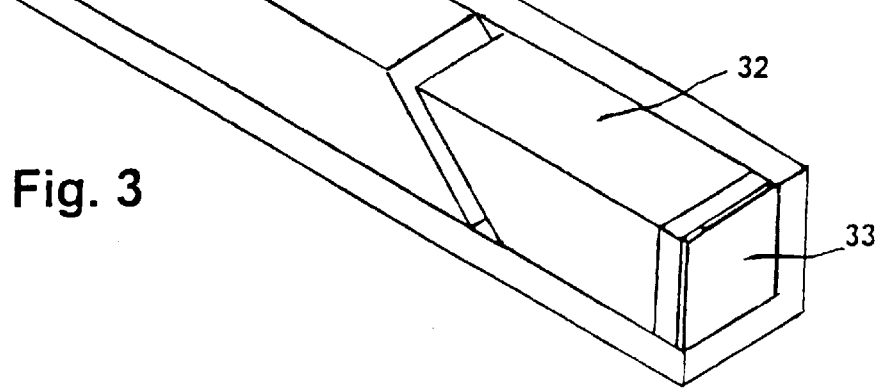
FIG. 3 shows a cavity similar to FIG. 2, but assembled against two upper flat sides of a temperature matched pallet with an L-shaped cross-section.

FIG. 3 shows yet another embodiment of an assembly 30 wherein the long and short rods may be the same as shown in FIG. 1 or FIG. 2, but instead of a flat pallet a pallet 31 with an L-shaped cross-section is used. The rods in this configuration can be aligned by the application of pressure alone during the clamping step. The two mating surfaces of the pallet must of course be manufactured to the same tolerances as the rods.

Figure 4:
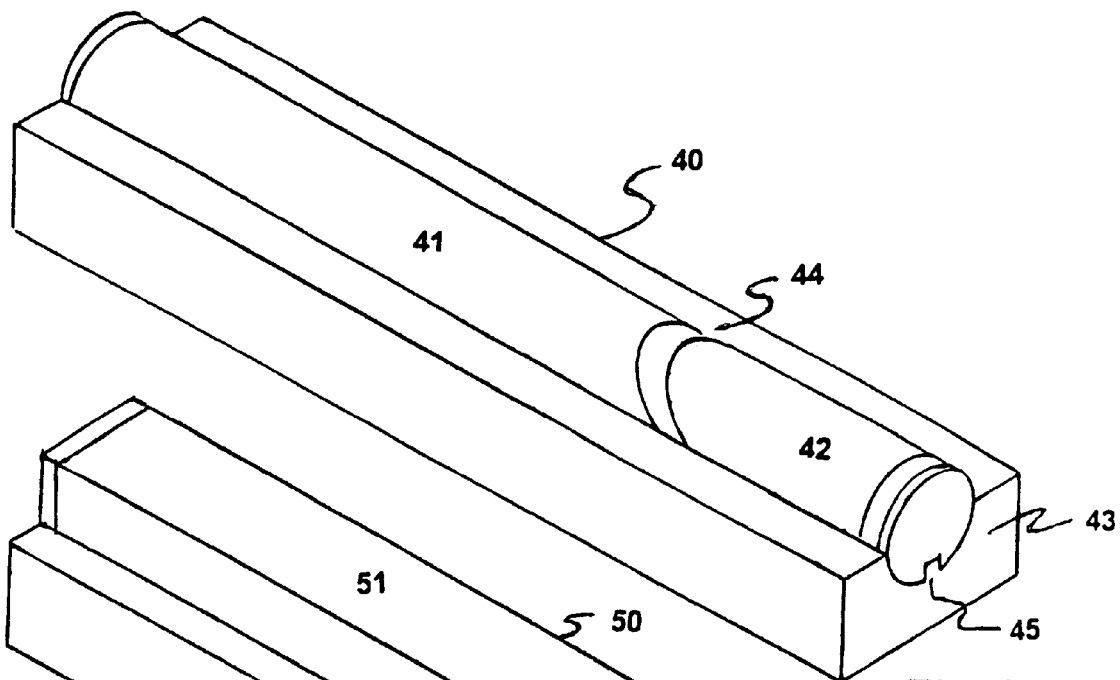
FIG. 4 shows a cavity similar to FIG. 2, but using rods with a circular cross-section assembled in a mating circular groove in a broad flat upper face of the temperature matched pallet.

FIG. 4 shows yet another embodiment of an assembly 40 wherein the long and short rods 41 and 42 have round cross-sections. The pallet 43 has a large cylindrical groove to align the rod axes. When combined with a polarizer a projection or ridge and a small mating groove 45 may be provided on the rods and pallet, as shown or in reverse, to properly orient the polarizing elements. A small flattened side on the rods and in the large groove will serve the same purpose. A large groove cross-section much less than half that of the rod is preferred to make it easier to manipulate the rods and to conserve the material used for the pallet, i.e. to make the latter thinner.

Figure 5:
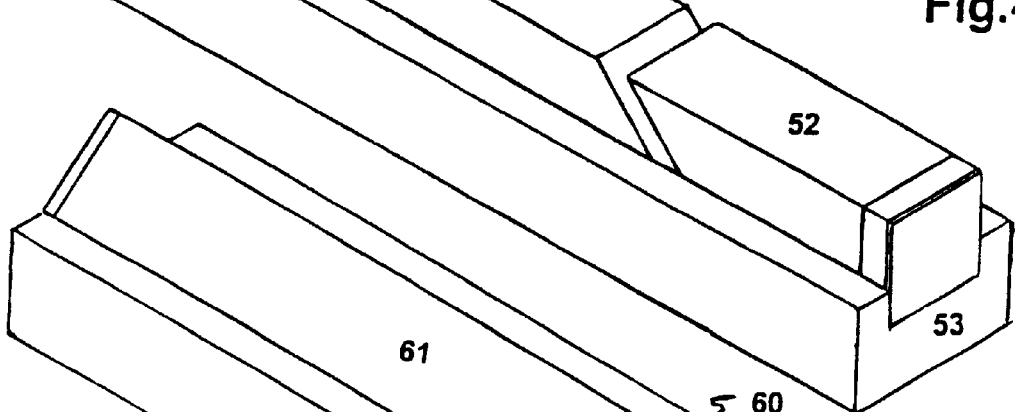
FIG. 5 shows a cavity similar to FIG. 4, but with rods of rectangular or square-shaped cross-section assembled in a mating rectangular groove.

FIG. 5 shows yet another embodiment of an assembly 50 wherein the long and short rods 51 and 52 have rectangular or square cross-sections. The pallet 53 has a rectangular groove to align the rod axes. When combined with a polarizer the square cross-section simplifies alignment of the polarizing elements. This, of course, is true of any of the pallets using this cross-section. Again using a groove of least cross-section makes it easier to manipulate the rods and conserves the material used for the pallet.

Figure 6:
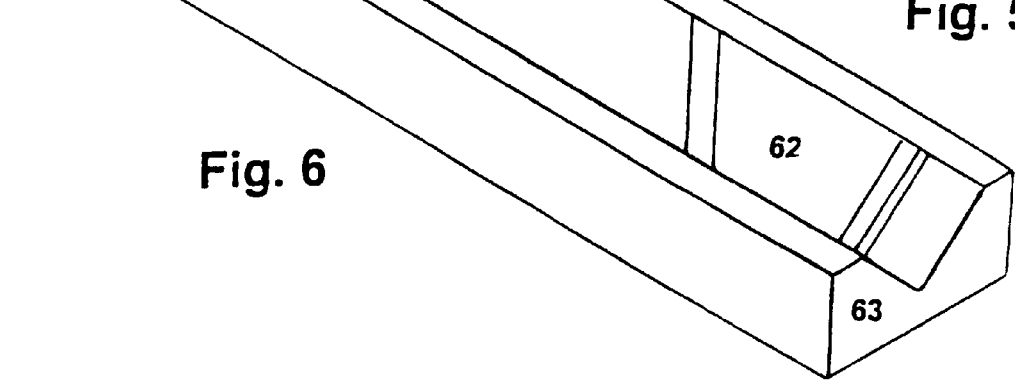
FIG. 6 shows a cavity similar to FIG. 5, but with rods of rectangular or square-shaped cross-section assembled in a mating V-shaped groove.

FIG. 6 shows yet another embodiment of an assembly 60 wherein the long and short rods 61 and 62 have square or diamond-shaped cross-sections. The pallet 63 has a triangular groove to align the rod axes. When combined with a polarizer this shape cross-section also simplifies alignment of the polarizing elements. Again using a groove of least cross-section makes it easier to manipulate the rods and conserves the material used for the pallet. A triangular groove is also easier to machine than a round or rectangular one. It also removes less material from the pallet. leaving it stronger.

Figure 7:
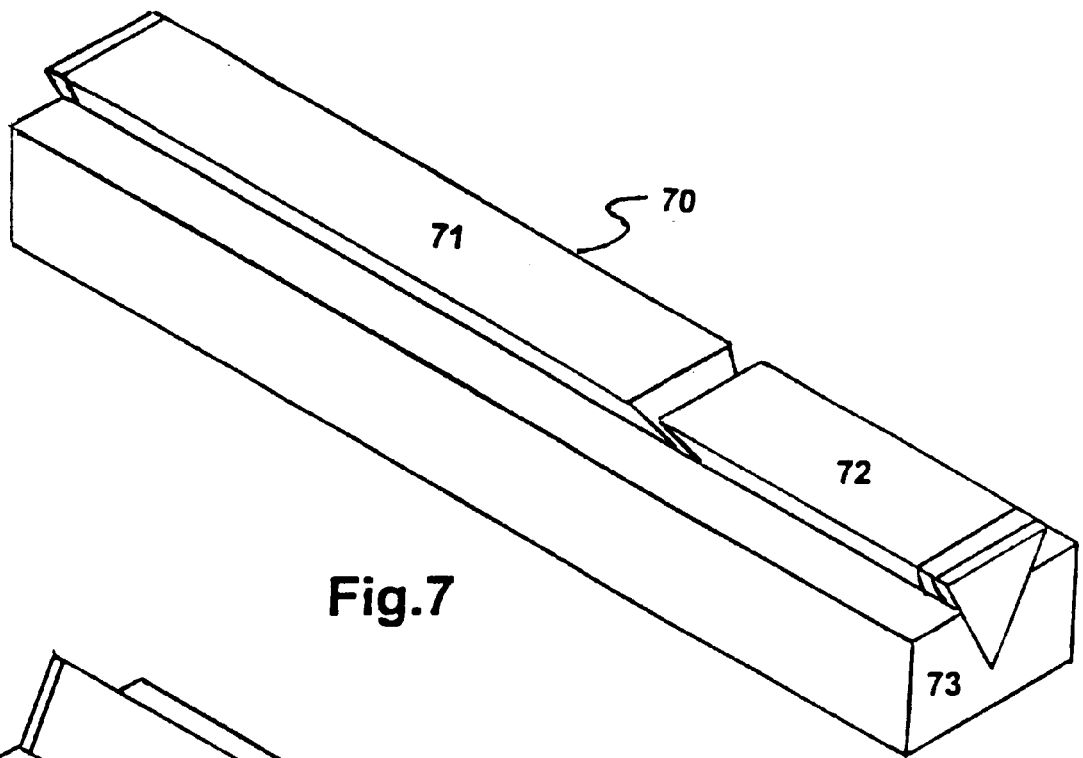
FIG. 7 shows a cavity similar to FIG. 6, but with rods of triangular cross-section assembled in a mating V-shaped groove.

FIG. 7 shows yet another embodiment of an assembly 70 wherein the long and short rods 71 and 72 have triangular cross-sections. The pallet 73 has a triangular groove to align the rod axes. If the cross-sections are regular the groove angle will measure 60°. This arrangement has the same advantages as discussed at FIG. 6. Triangular and square rods provide a greater yield from a boule than round ones and may have certain advantages in machining. A further advantage of this cross-section may also be realized in pump and laser radiation confinement by reflection at the sides.

Figure 8:
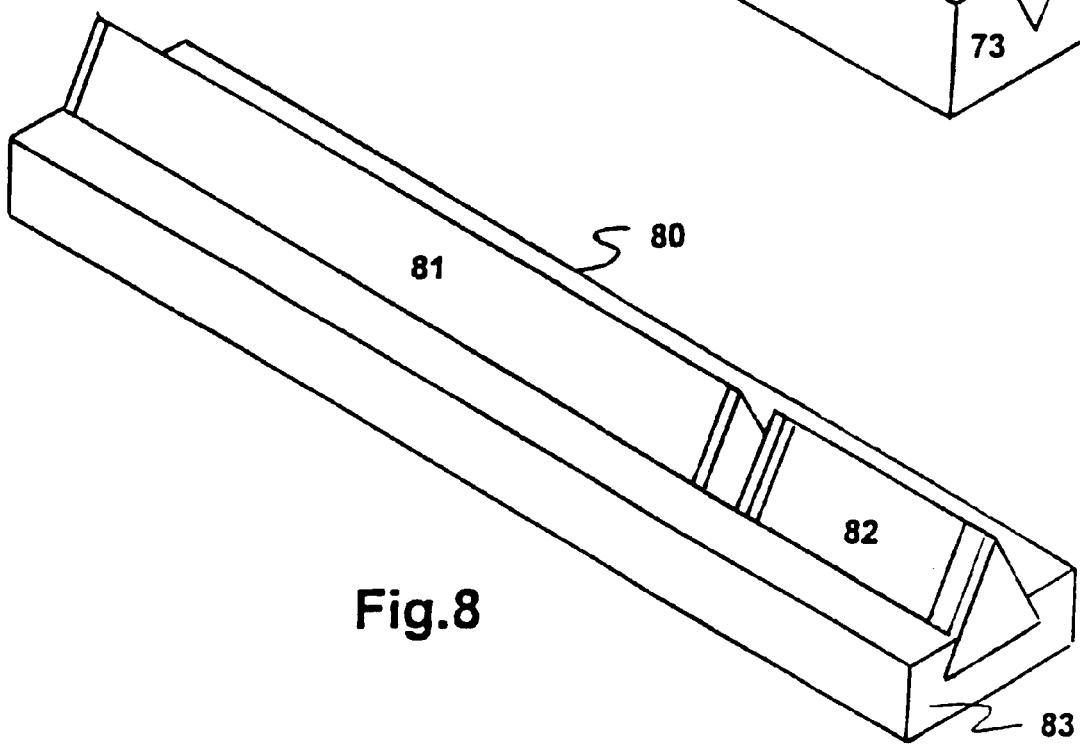
FIG. 8 shows a cavity similar to FIG. 7, but with the rods assembled in a mating dual dove-tail groove.

FIG. 8 shows a final embodiment of an assembly 70 wherein the long and short rods 71 and 72 have triangular cross-sections. The pallet 63 has a trapezoidal groove to align the rod axes. If the rods have regular cross-sections, the sides of the groove make 60° angles with the bottom of the groove. The rods must be inserted in the ends of the groove and are locked in as the pallet is rotated about the longitudinal optical axis. With close tolerances the optical axes will remain in alignment without clamping during the bonding procedure, for most orientations of the pallet. Those skilled in the art will obviously be able to extend these teachings to all regular polygonal cross-sections and many non-regular ones as well.

Current crystal cutting and coating techniques can easily accommodate the tolerances necessary for all designs presented in this application. The mirror plated q-switch or other similarly plated wafer is bonded to the short rod of gain material to form a single element using one of at least two techniques. The simplest approach is to bond the components together using a small amount of epoxy under sustained pressure, so that the laser resonator characteristics are not destroyed. The second method is to employ a technique known as diffusion bonding, which unites the two surfaces directly without an adhesive.

The pseudo-monolithic design applies to gain materials and laser resonator designs other than that shown here. For instance, Nd:YVO4 is a well-known material that has been considered as an alternate to Nd:YAG for the laser rod. It has the advantage of producing a linear polarized beam without a Brewster Gap, however, it is more expensive than Nd:YAG and softer, making it harder to machine. For purposes of the present invention, it also has a thermal mismatch to the Cr(4+):YAG passive Q-switch.

The advantage of the monolithic approach lies in the reduced number of optical components required to achieve the same function. This results in lower system cost, less complexity, and eliminates the need to periodically realign the four separate optical components, which make up the resonator in the standard configuration. The curved design of the HR and/or OC mirrors can improve output beam quality and reduce manufacturing alignment tolerance requirements. In addition, the coating on the output coupler could be designed to have a radially graded reflectance at the output wavelength to produce a desired beam profile and beam quality.

The method of manufacture for the resonance cavity used with a high intensity flash lamp type of optical pump according to the present invention; comprises the steps of:

(A) machining a long rod of laser gain material having a uniform cross-section with a straight line optical axis centered therein, at least a first side-face parallel to the axis within a small fraction of a micrometer, a first and second end-faces selected from a group comprising end-faces flat within a small fraction of a micrometer oriented normal to the axis within a tolerance of at most thirty seconds, but preferably no more than ten seconds of arc, similar flat end-faces oriented at Brewster's angle to the axis and convex spherical end-faces defined by spheres several meters in diameter centered on the optical axis having the same dimensional tolerances;

(B) machining a short rod of laser gain material having the same characteristics as the long rod including a second short version of the first side-face, a third and fourth end-face;

(C) machining at least one wafer from a group of materials that define Q-switches, polarizers and frequency filters for lasers, the wafer having the same cross-section with opposed broad parallel end-faces machined to the same dimensional tolerances as the short rod, one end-face of which mates with one end-face of the short rod;

(D) aligning and permanently bonding the one end-face of the wafer to the third end-face of the short rod; and (E) coating the first end-face of the long rod and the remaining exposed output end-face of the wafer with a mirror that efficiently reflects radiation having a wavelength between 1 and 10 micrometers.

It may also include the following substeps of:

(C₁) repeating step C to provide at least two different members of the wafer group; and (C₂) aligning and permanently bonding mating end-faces of the wafers to form one composite wafer from all the wafers before performing steps D and E.

It may further include the additional steps of:

(F) machining a thin pallet from a material having the same coefficient of thermal expansion as the gain material such that the pallet defines a broad flat bottom surface, a broad top surface including a selected portion that mates with at least a portion of the side surfaces of both the long and short rods;

(G) coating the mating surfaces with a lubricating and bonding material; and (H) pressing the mating surfaces together, while aligning the rod axes with each other and parallel to the bottom surface, until the surfaces bond.

It may also include the following substep of:

(F₁) machining edge portions of the pallet to engage mating surfaces on the flash lamp.

It may further include the following substeps of:

(A₁) machining a third side-face on the long rod similar to the first side-face thereon, at a selected angle thereto;

(B₁) machining a fourth side-face on the short rod similar to the second side-face, at the selected angle thereto;

(G₁) placing at least one straight edge adjacent the broad top surface parallel to the optical axis; and (G₂) pressing the second and fourth side surfaces against the straight edge before the mating surfaces bond.

It may also include the substep of:

(F₂) machining a groove in the top surface of the pallet, a first surface of the groove defining the selected portion.

It may further include the substeps of:

(A₁) machining a third side-face on the long rod similar to the first side-face thereon, at a selected angle thereto;

(B₁) machining a fourth side-face on the short rod similar to the second side-face, at the selected angle thereto;

(F₂) machining a V-shaped groove in the top surface of the pallet such that the two sides of the groove intersect at the selected angle.

It may further include the substeps of:

(B₁) machining a single circularly cylindrical side-face on both the long and short rods; and (F₂) machining a shallow mating cylindrical groove in the top surface of the pallet.

And finally it may include the substeps of:

(B₁) machining four perpendicular side-faces on both the long and short rods; and (F₂) machining a shallow mating rectangular groove in the top surface of the pallet.

While this invention has been described in terms of preferred embodiment consisting of a one piece assembly made a number of critically arranged elements, those skilled in the art will recognize the true scope of the invention as defined in the claims which follow.

Having thus described our invention, what we claim as new and desire to secure by Letters Patent is as follows:

1. A small high power pulsed laser subassembly for use with a gas discharge or similar high power pump means for emitting photons at a first wavelength; comprising:

a thin pallet with a broad flat substantially rectangular bottom surface, a broad top surface defining a straight optical axis parallel within ten arc seconds to the longitudinal centerline on both of said surfaces, said pallet further having a uniform cross-section normal to said axis, whereby said axis is normally spaced a constant given distance from said top surface;

long and short laser rods of the same nonconductive crystalline material, which emits photons of a second wavelength in response to said pump photons, said rods having a combined length less than the length of said pallet, a central longitudinal axis on said optical axis, uniform cross-sections with maximum dimensions approximately an order of magnitude smaller than the length of said long rod, first and second long rod plus third and fourth short rod axially sequential end-faces chosen from a group of surfaces comprising flat surfaces and convex surfaces with a radius of curvature centered on said axis that is longer than two meters, said end-faces being centered normal to said axis within thirty arc seconds and said rods further having side-faces of uniform width extending the full length of said rods, parallel within thirty arc seconds to said axis and normally spaced said given distance from said axis, thereby abutting a mating portion of said top surface with said same uniform width, but extending the full length of said pallet;

a highly reflective mirror coated on said first end-face that reflects substantially all of said beam photons impinging thereon toward said fourth end-face;

an output coupling mirror means having opposed surfaces parallel to said fourth end-face, permanently attached to said short rod over said fourth end-face, said output mirror means including a reflective layer for passing a small percentage of said beam photons while reflecting the remainder toward said first end-face; and an adherence layer applied between said side-faces and said mating portions which acts briefly as a lubricant before hardening.

2. A laser subassembly according to claim 1; wherein said output mirror means further includes:

a thin wafer of material, that acts as a Q-switch, having fifth and sixth parallel end-faces also having the same cross-section and axial angular tolerances as said other end-faces, said fifth end-face mating with said fourth endface and said reflective layer being plated on said sixth end face; and a wave matching adhesive layer for said second wavelength cemented between said fourth and fifth end-faces.

3. A laser subassembly according to claim 1; wherein said second and third end-faces are flat and further including:

a polarizing means including an oriented layer with seventh and eighth flat parallel end-faces, having the same cross-section and axial angular tolerances as said second and third end-faces, sandwiched between said second and third end-faces to linearly polarize said beam during the lasing process.

4. A laser subassembly according to claim 3; wherein:

said oriented layer includes crystalline material for polarizing light at said second wavelength.

5. A laser subassembly according to claim 1; wherein:

said second and third end-faces are flat, parallel within thirty arc seconds and tilted at the Brewster angle to said optical axis and separated by less than a millimeter.

6. A laser subassembly according to claim 2; wherein said long and short rods are laser grade Nd:YAG, said pallet is non-laser grade Nd:YAG and said wafer of Q-switch material is CR(4+):YAG.

7. A laser subassembly according to claim 3; further including:
   an anti-reflection coating on two of said second, third and seventh end-faces for radiation at said second wavelength.

8. A laser subassembly according to claim 1; wherein:
said axial angular tolerance is ten seconds of arc.

9. A laser subassembly according to claim 5; wherein:
said axial angular tolerance is ten seconds of arc.

10. A laser subassembly according to claim 1; wherein:
said side faces and mating portions are flat.

11. A laser subassembly according to claim 1; wherein:
said side faces and mating portions are portions of a circularly cylindrical surface coaxial with said optical axis.

12. A laser subassembly according to claim 10; wherein:
said side faces and mating portions define the bottom of a groove in said pallet.

* * * * *